US010605257B2

(12) United States Patent
Power et al.

(10) Patent No.: US 10,605,257 B2
(45) Date of Patent: Mar. 31, 2020

(54) THRUST-RING AND ROTOR FAN SYSTEM (71) Applicant: Rolls-Royce Corporation, Indianapolis, IN (US)

(72) Inventors: Bronwyn Power, Indianapolis, IN (US); Jonathan M. Rivers, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 770 days.

(21) Appl. No.: 15/338,035

(22) Filed: Oct. 28, 2016

(65) Prior Publication Data

US 2018/0231016 A1 Aug. 16, 2018

(51) Int. Cl.
*B64C 11/00* (2006.01)
*F01D 5/22* (2006.01)
(Continued)

(52) U.S. Cl.
CPC ............ *F04D 29/282* (2013.01); *B63H 1/16* (2013.01); *B64C 11/001* (2013.01); *B64C 11/06* (2013.01); *F01D 5/143* (2013.01); *F01D 5/225* (2013.01); *F02C 9/58* (2013.01); *F02K 3/04* (2013.01); *F02K 3/072* (2013.01); *F04D 29/326* (2013.01);
(Continued)

(58) Field of Classification Search
CPC ... B63H 1/16; B63H 2001/165; B64C 11/001; B64C 2201/162; B64D 2027/005; F01D 5/225; F02K 3/04; F02K 3/072; F04D 29/326; F05D 2220/323; F05D 2220/326; F05D 2220/327; F05D 2220/36
See application file for complete search history.

(56) References Cited

U.S. PATENT DOCUMENTS 4,767,270 A * 8/1988 Seidel .................. B64C 11/001
416/129
4,796,424 A * 1/1989 Farrar ...................... F02C 7/04
244/69
(Continued)

FOREIGN PATENT DOCUMENTS

DE 102008008060 A1 * 5/2009 ............... B63H 1/16
EP 2799334 A1 11/2014
(Continued)

OTHER PUBLICATIONS

Extended European Search Report dated Mar. 19, 2018, for European Patent Application No. 17194522.3, Applicant, Rolls-Royce Corporation, (9 pages).
(Continued)

*Primary Examiner* — Justin D Seabe
*Assistant Examiner* — Christopher R Legendre
(74) *Attorney, Agent, or Firm* — McCracken & Gillen LLC (57) ABSTRACT A fan system includes a rotor having plurality of blades and a ring airfoil, the plurality of blades being rotatably joined to a hub and the ring airfoil. The fan system may include a second contra-rotationally disposed rotor having a plurality of blades and a ring airfoil. The first and second ring airfoils having a cambered shape and an angle of attack between about −5 degrees and about 45 degrees, more preferably between about 5 degrees and about 30 degrees. Optionally, an outlet guide vane may be mounted rearward of the one or more rotors having a ring airfoil.

12 Claims, 6 Drawing Sheets

(51) Int. Cl.
  *F04D 29/32* (2006.01)
  *F02K 3/04* (2006.01)
  *F02K 3/072* (2006.01)
  *B63H 1/16* (2006.01)
  *B64D 27/00* (2006.01)
  *F04D 29/28* (2006.01)
  *F02C 9/58* (2006.01)
  *F01D 5/14* (2006.01)
  *B64C 11/06* (2006.01)
  *F04D 29/34* (2006.01)
  *B23K 101/00* (2006.01)

(52) U.S. Cl.
  CPC ........ *F04D 29/34* (2013.01); *B23K 2101/001* (2018.08); *B64C 2201/162* (2013.01); *B64C 2201/165* (2013.01); *B64D 2027/005* (2013.01); *F04D 29/329* (2013.01); *F05D 2220/323* (2013.01); *F05D 2220/326* (2013.01); *F05D 2220/327* (2013.01); *F05D 2220/36* (2013.01)

(56) References Cited

U.S. PATENT DOCUMENTS 5,096,382 A       3/1992  Gratzer
2014/0321968 A1*  10/2014 Kreitmair-Steck ... F04D 29/326
                                                      415/1
2018/0231016 A1*  8/2018  Power .................... B64C 11/06

FOREIGN PATENT DOCUMENTS

FR    3030445 A1     6/2016
GB    1324356 A  *  7/1973  ............... B63H 1/16
GB    2179405 A  *  3/1987  ........... B64C 11/001

OTHER PUBLICATIONS

Extended European Search Report dated Mar. 20, 2018, for European Patent Application No. 17196349.9, Applicant, Rolls-Royce Corporation, (8 pages).

* cited by examiner

THRUST-RING AND ROTOR FAN SYSTEM

FIELD OF DISCLOSURE

The present disclosure generally relates to fan systems for gas turbine engines. More particularly, but not exclusively, the present disclosure relates to configurations and orientations of fan blades attached to one or more rotors having a ring airfoil.

BACKGROUND

Providing engine equipment to operate at a high propulsive efficiency, with minimal drag, and having minimal weight, remains an area of interest. Some fan blade systems employ various geometries that redirect airflow or redistribute weight to increase efficiency. Specifically, fan blade systems may include various blade shapes with and without nacelles. Overall, existing systems have various shortcomings relative to certain applications. Accordingly, there remains a need for further contributions in this area of technology.

SUMMARY

According to one aspect, a fan system has a rotor being rotatable about an axis. The rotor has a plurality of blades attached to a hub. A ring airfoil is attached to each of the plurality of blades, wherein the ring airfoil has a cambered cross section, and the ring airfoil forms an angle of attack relative to the axis.

According to another aspect, a fan system having a first rotor that is rotatable about an axis with a first plurality of blades extending outwardly from a first hub. A first ring airfoil is attached to each of the first plurality of blades. A second rotor has a second plurality of blades attached to a second hub. A second ring airfoil is attached to each of the second plurality of blades, and first rotor and the second rotor are contra-rotationally disposed on a shaft.

According to another aspect, a method for operating a fan system includes providing a rotor with a plurality of blades joined by a ring airfoil. The ring airfoil has a camber and an angle of attack between about −5 degrees and about 45 degrees. When the first rotor rotates about a central axis, the blades generate thrust, and the ring airfoil generates thrust.

Other aspects and advantages will become apparent upon consideration of the following detailed description and the attached drawings wherein like numerals designate like structures throughout the specification.

DETAILED DESCRIPTION

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended. Any alterations and further modifications in the described embodiments, and any further applications of the principles of the disclosure as described herein are contemplated as would normally occur to one skilled in the art to which the disclosure relates.

Fan systems have numerous performance requirements to consider including: fuel efficiency, component strength, useful life, fan bade off containment (which may entail debris of various size and energy), noise emission, and power output. Fan systems include a fan system having fan blades mounted on a hub that rotate about an axis.

The thrust ring and rotor fan system is a new form of aircraft propulsion system intended for civil and military aircraft operating at high-subsonic cruise Mach numbers and for both long and short-distance mission profiles. The ring airfoil (thrust ring) is cambered, meaning that the chord line and the camber line of the ring airfoil are not the same.

The thrust ring and rotor fan system can be conceptualized as an optimum blend of ultra-high-bypass-ratio turbofan and open-rotor engine configurations: the very high propulsive efficiency of the open rotor is retained, while the open-rotor's loss-inducing tip vortices, large diameter versus thrust, lack of noise shielding and blade-off containment is circumvented as side-benefits. The difficulties with Ultrafan configurations such as large nacelle drag and thrust-reversal implementation are also circumvented as side-benefits. The reduced thrust requirement at cruise is affected primarily by varying rotor pitch, reducing the rotor thrust component and hence stream-tube contraction, thereby also reducing ring lift and ring thrust).

Figure 1:
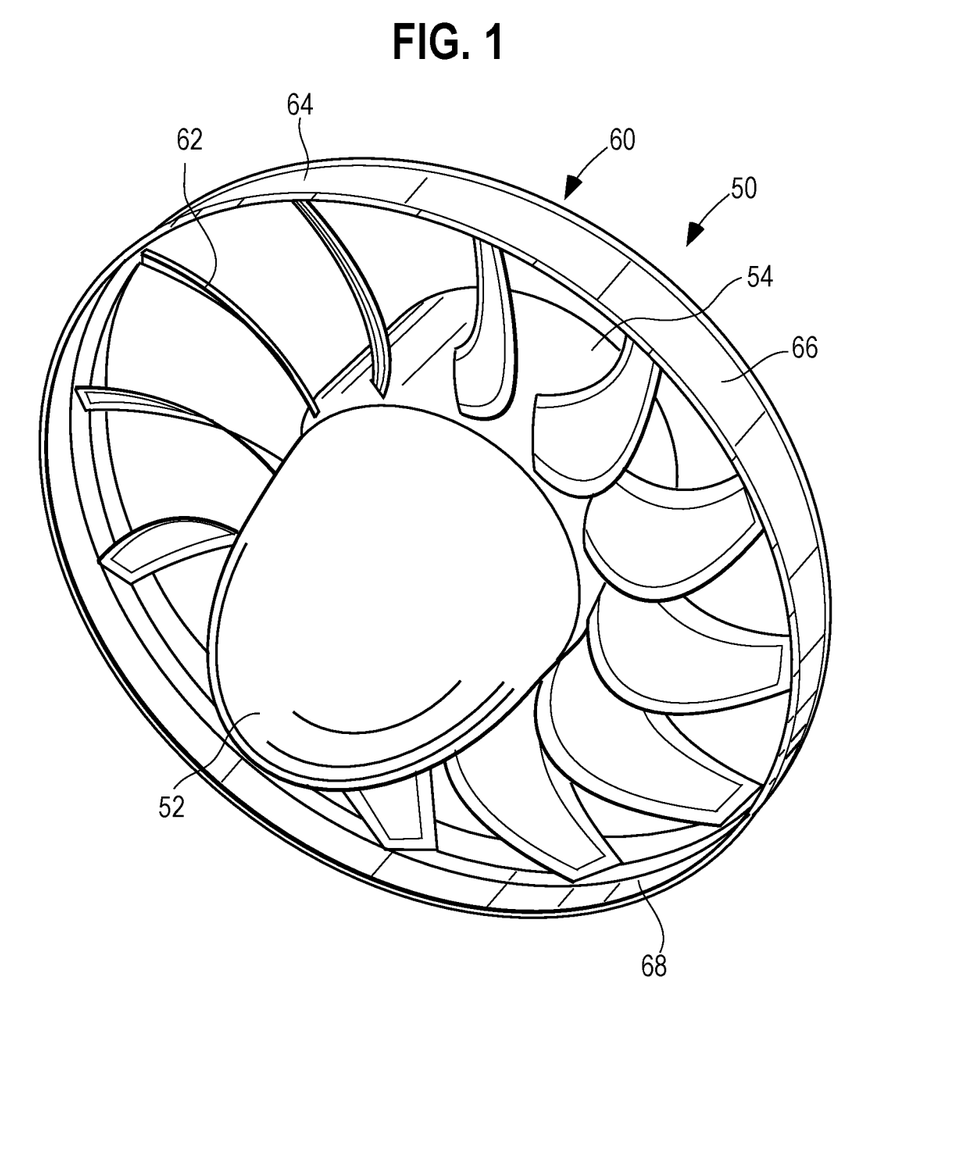
FIG. 1 depicts an isometric view of a first embodiment of a fan system including a ring airfoil and a plurality of fan blades attached to a hub.

Referring to FIG. 1, a thrust ring and rotor fan system 50 is illustrated having a nose 52 and a rotor 60 mounted on a hub 54 to the rear of the nose 52. The rotor 60 includes radial blades 62 that extend outwardly from the hub 54 and are joined together by a ring airfoil 64. The ring airfoil 64 has an outboard surface 66 and an inboard surface 68. The blades 62 extend radially from the hub 54 and are rotatably mounted (variable pitch radial fan blades) to the ring airfoil 64. The blades 62 and the ring airfoil 64 rotated about an axis of rotation.

The thrust ring and rotor fan system 50 has variable-pitch rotor blades 62 without a nacelle. The ring airfoil 64 is comprised of a cambered airfoil section (see FIG. 3) that rotates about the axis of rotation with the blades 62 to form a rotor 60. The inboard surface (suction-surface) 68 of the ring-airfoil is directed inward towards the axis of rotation. The angle-of-attack of the ring airfoil 64 is set to exploit the variation of the stream-tube across the thrust ring and rotor fan system 50. At take-off, the wide stream tube causes the ring airfoil 64 to see a positive flow-incidence, inducing lift with a component that generates thrust. At cruise, the stream-tube is virtually parallel to the axial direction and the ring airfoil 64 operates near its zero-lift incidence, see FIG. 3 & FIG. 4.

Optionally, the system can include one or more leading edge slats to enhance ring lift at high-incidence conditions, including take-off and cross-wind, which are disclosed in United States Patent Application Serial No. filed on Oct. 28, 2016 entitled THRUST RING AND ROTOR FAN SYSTEM WITH PASSIVE LEADING EDGE SLATS and is also assigned to the same assignee as the present application (attorney docket no. C0537/RCA11645US) which is incorporated by reference in its entirety as if set forth fully herein.

Figure 2:
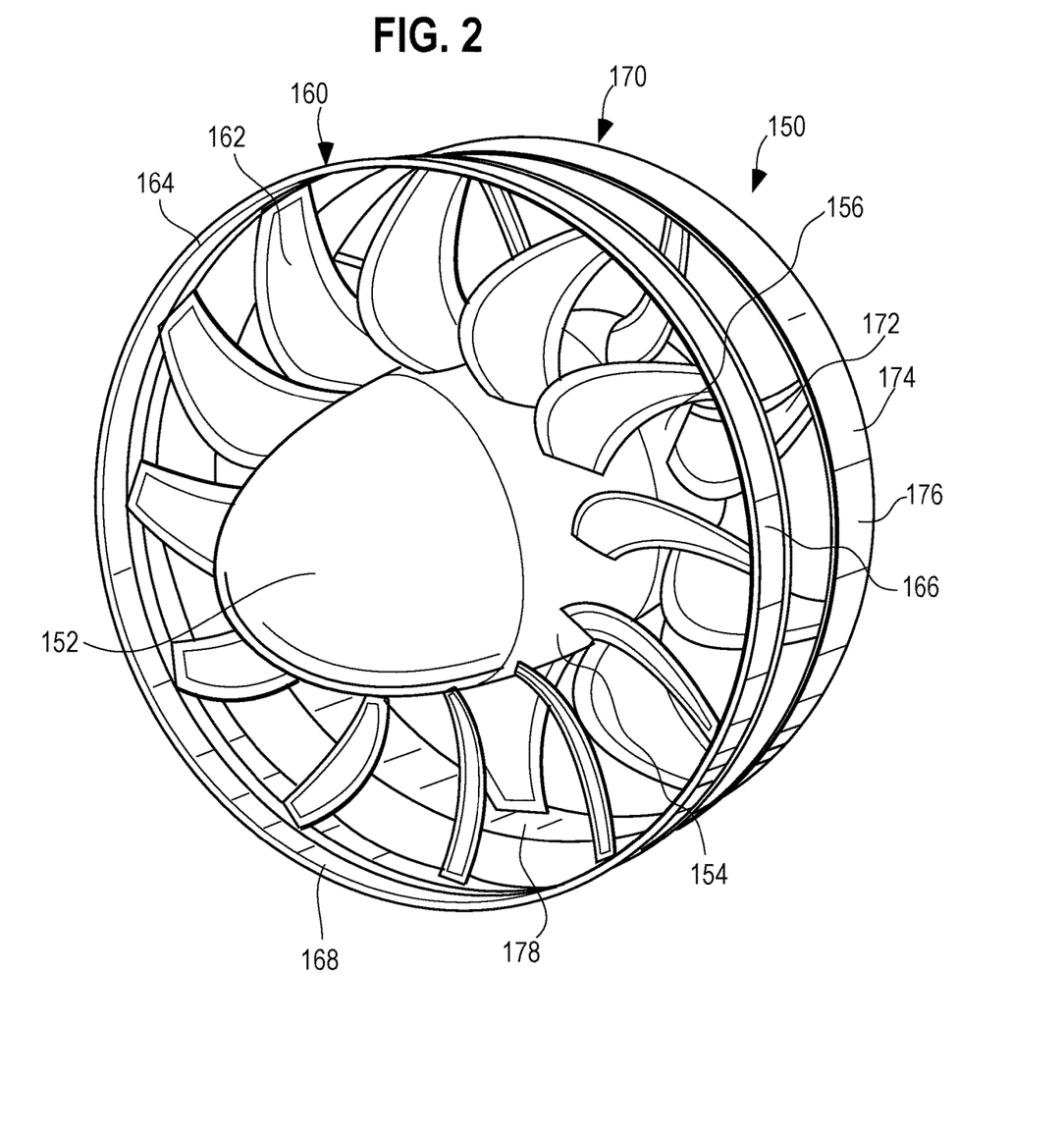
FIG. 2 depicts an isometric view of a second embodiment of a fan system including two contra-rotating rotors of ring airfoils and fan blades attached to hubs.

Referring to FIG. 2, a second embodiment of the thrust ring and rotor fan system 150 is shown. The fan system 150 has two rotor sets 160, 170 that are disposed in a contra-rotating arrangement (the two rotors turn in opposite directions similar to that of an open-rotor). A third embodiment includes a single rotor set with outlet guide vanes located downstream of the fan, see FIG. 7.

The front ring airfoil 164 is joined to the front hub 154 by a series of front blades 162 that extend radially from the front hub 154 and are rotatable (variable-pitch). The front hub 154 is mounted rearward of the nose 152 and forward of the rear hub 156 and rotates around an axis. The front ring airfoil 164 further includes a front outboard surface 166 (pressure side) and a front inboard surface 168 (suction side).

The rear rotor 170 includes a rear ring airfoil 174 having a rear outboard surface 176 and a rear inboard surface 178. The rear ring airfoil 174 is joined to the rear hub 156 by a series of rear blades 172 that extend radially from the rear hub 156 and are rotatable. The rotors may preferably be geared to achieve the low rotor tip-speeds intended for maximum propulsive efficiency and minimum noise emission.

The front rotor 160 and the rear rotor 170 turn in opposite directions (contra-rotating rotors) and can form the primary low-pressure compression phase of a pusher, puller or mid-located engine configuration. The rotor sets may preferably be geared to achieve the low rotor tip-speeds intended for maximum propulsive efficiency and minimum noise emission.

Further, the present disclosure contemplates use in other applications that may not be aircraft related such as industrial fan applications, power generation, pumping sets, naval propulsion, weapon systems, security systems, perimeter defense/security systems, and the like known to one of ordinary skill in the art.

Figure 3:
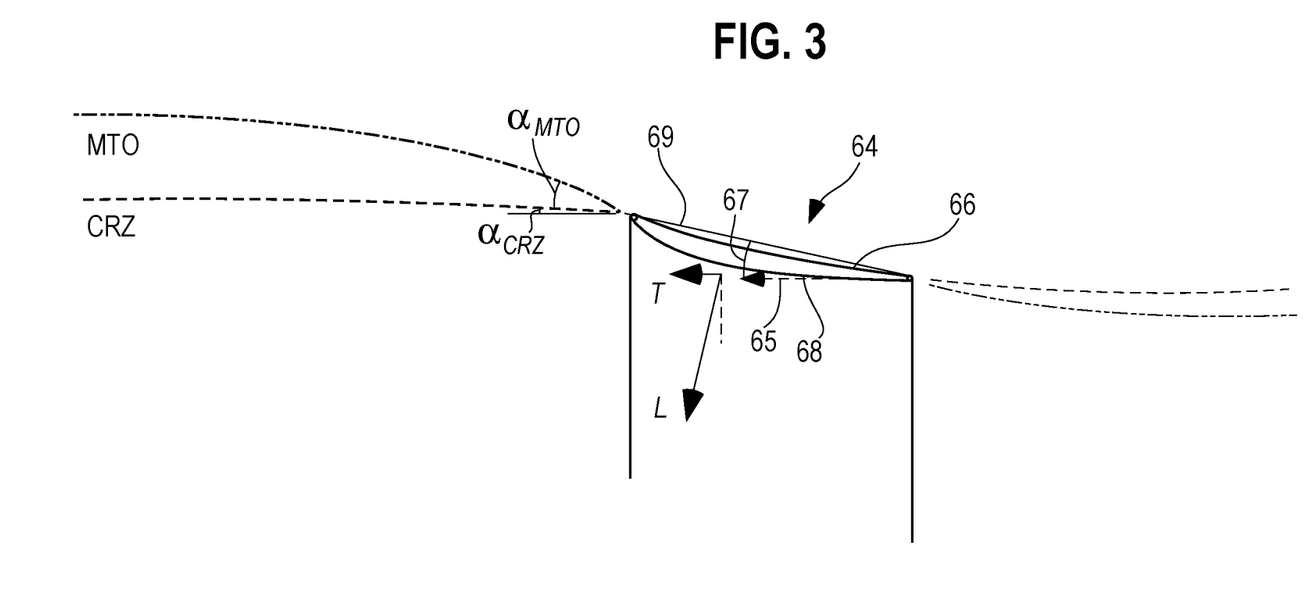
FIG. 3 depicts a schematic of stream tube experienced by the first embodiment of the fan system at different operating regions.

Referring to FIG. 3, an embodiment of the fan system 50 is shown with different airflows in relation to the fan system 50. At take-off (MTO) the blades (not shown) will be highly loaded and the stream tube will be relatively wide ($\alpha_{MTO}$). The angle of attack 67 is defined by the chord line 69 of the ring airfoil 64 in relation to the axial direction 65. A positive angle of attack as shown in FIG. 3 will cause the ring airfoil 64 to generate lift (L) and a thrust component (T) in the direction of travel. At cruise (CRZ) the blades (not shown) will be unloaded. This narrower stream tube ($\alpha_{CRZ}$) results in a small incidence angle on the ring airfoil 64, and the ring airfoil 64 approaches a zero lift condition.

Figure 4:
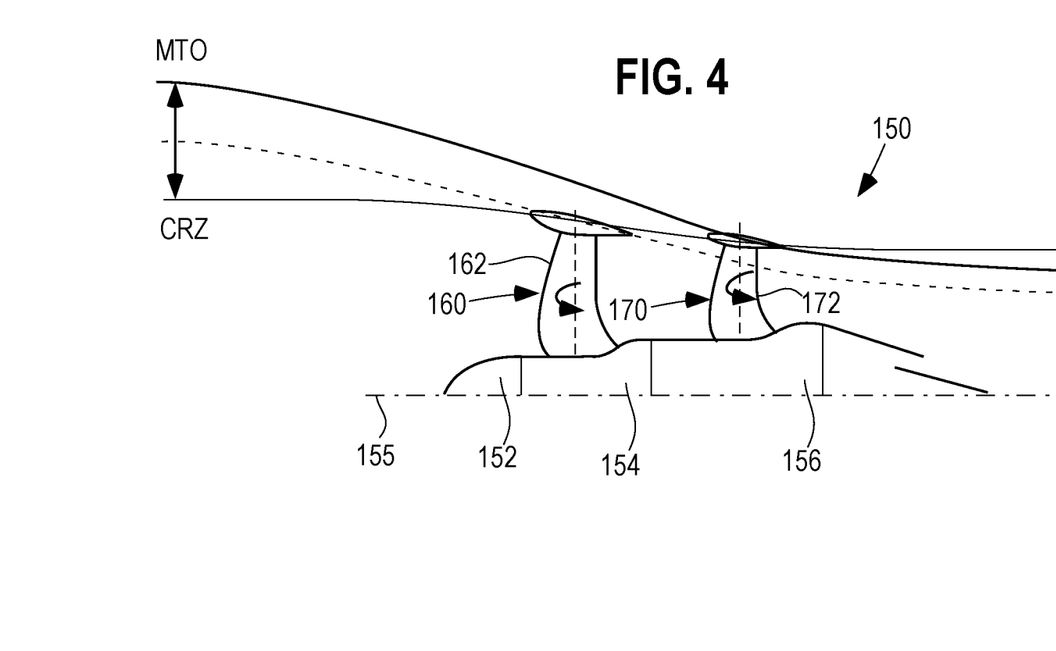
FIG. 4 depicts a schematic of stream tube experienced by the second embodiment of the fan system at different operating regions.

Referring to FIG. 4, a schematic is shown of the second embodiment of the fan system 150. The nose 152, the front hub 154, and the rear hub 156 are mounted along the axis 155 of rotation. At take-off (MTO—shown with a dashed line corresponding to the front ring airfoil 164 and a solid like corresponding to the rear ring airfoil 174), the wide stream tube causes a portion of air to bypass the front rotor 160 and enter the second rotor 170. At cruise, the narrow stream tube causes air to enter both rotors 160, 170.

In the illustrated embodiment, the front blades 162 and rear blades 172 are pivotable about a radial axis (variable pitch). This facilitates loading and unloading as needed to obviate the need for a thrust reverser.

Figure 5:
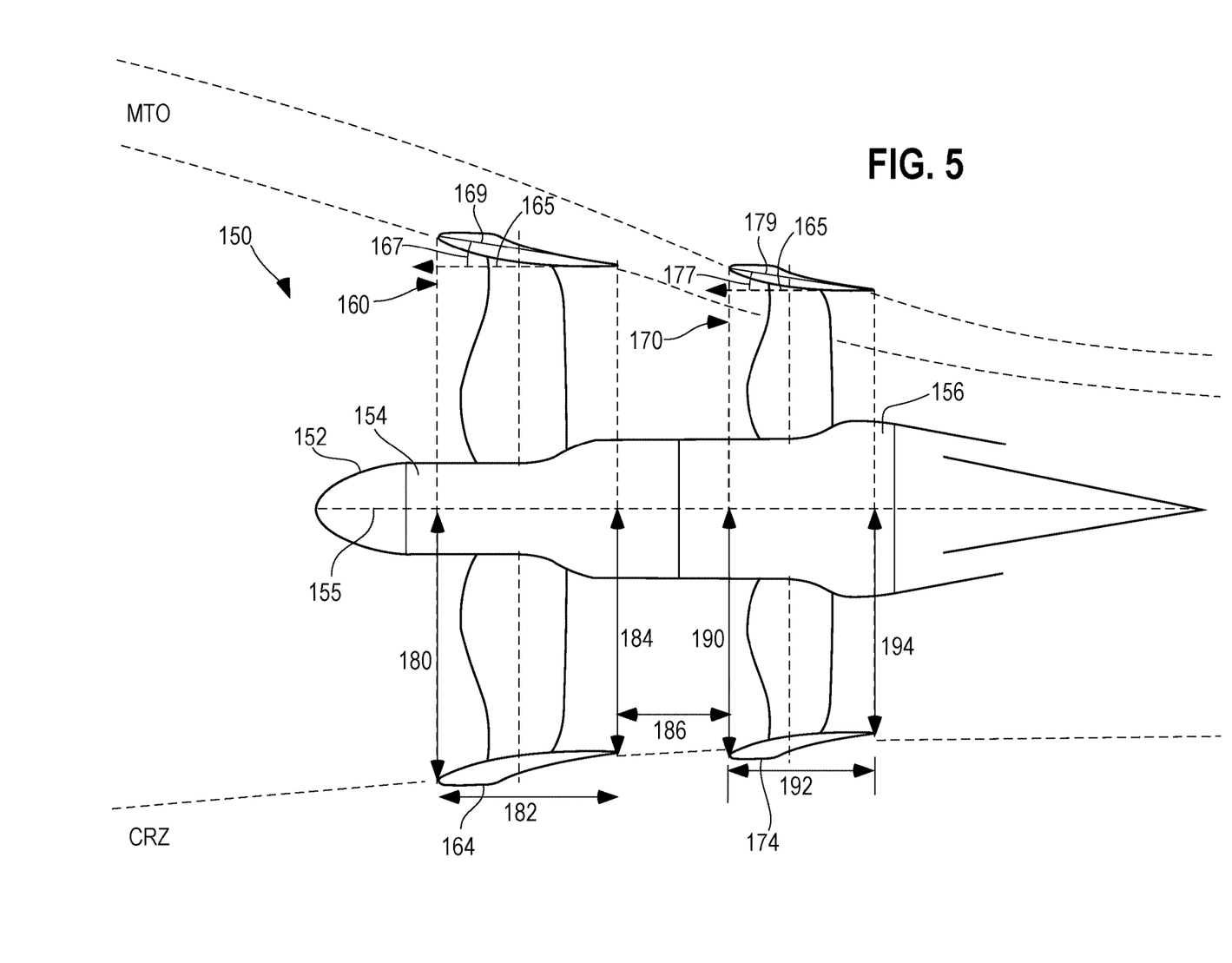
FIG. 5 depicts a sectional view of the second embodiment of the fan system.

Referring to FIG. 5, the fan system 150 rotates about an axis 155. The height of the rear rotor 170 is less than the front rotor 160 to catch the contracted stream tube coming off of the front rotor. The gap 186 between the front ring airfoil 164 and the rear ring airfoil 174 may be less than or greater than the axial length 182 of the front ring airfoil 164. In this embodiment, the gap 186 is greater than the axial length 182 of the front ring airfoil 164. In the illustrated embodiment, the front blades 162 (mounted to the front hub 154) and the rear blades (mounted to the rear hub 156) are variable pitch fan blades.

Further, the angle of attack 167 of the front ring airfoil 164 as defined by the chord line 169 of the front ring airfoil 164 and the axial direction 165 (parallel to the axis 155 of rotation) and is approximately 10°. Preferably, the angle of attack 167 is between about −5 degrees and about 45 degrees. More preferably the angle of attack is between about 5 degrees and about 30 degrees. The angle of attack 177 of the rear ring airfoil 174 as defined by the chord line 179 of the rear ring airfoil 174 and the axial direction 165 (parallel to the axis 155 of rotation). The angle of attack 177 is preferably between about −5 degrees and about 45 degrees, more preferably between about 5 degrees and about 30 degrees.

The leading edge radius 180 of the front ring airfoil 164 is greater than the leading edge radius 190 of the rear ring airfoil 174. Both the front ring airfoil 164 and the rear ring airfoil 174 are shown having angles of attack 167, 177. The leading edge radius 180 of the front airfoil 64 is greater than the trailing edge radius 184 of the front ring airfoil 164. Likewise, the leading edge radius 190 of the rear airfoil 174 is greater than the trialing edge radius 194 of the rear ring airfoil 174. FIG. 3 shows the angles of attack 67, 77 with reference to the axial direction 65, 165 (represented by dashed lines) that are parallel to the axis 55, 155 of rotation of the fan system 50, 150. Optionally, the trailing edge radius 184 of the front ring airfoil 164 is greater than the leading edge radius 190 of the rear ring airfoil 174.

The axial length 182 of the front ring airfoil 164 is less than the leading edge radius 180 of the front ring airfoil 164. Similarly, the axial length 192 of the rear ring airfoil 174 is less than the leading edge radius 190 of the rear ring airfoil 174. The gap 186 between the front ring airfoil 164 and the rear ring airfoil 174 may be less than or greater than the axial length 182 of the front ring airfoil 164.

The hub radius 116 at the leading edge of the front blades 62 is less than the hub radius 118 at the trailing edge of the front blades 62. Similarly the hub radius 120 at the leading edge of the rear blades 72 is less than the hub radius 122 at the trailing edge of the rear blades 72.

Figure 6:
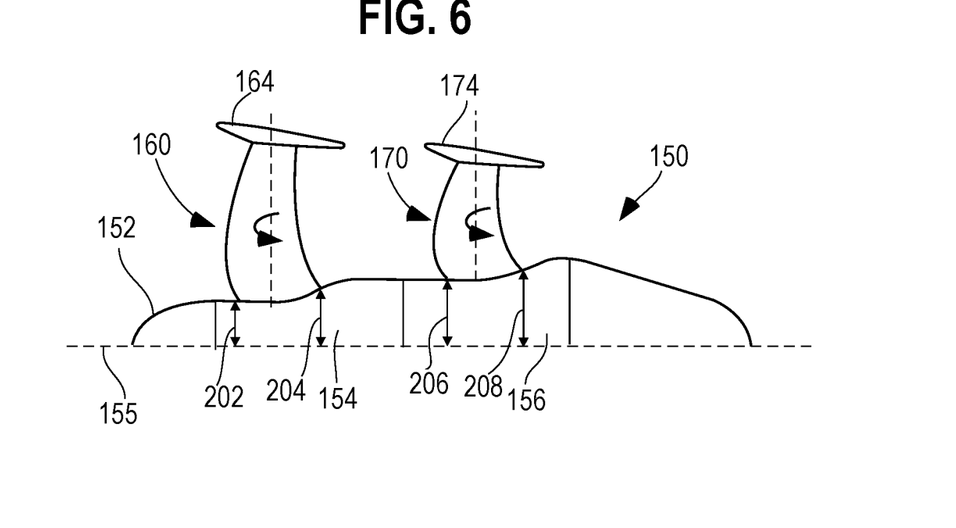
FIG. 6 depicts a sectional view of the second embodiment of the fan system.
Figure 7:
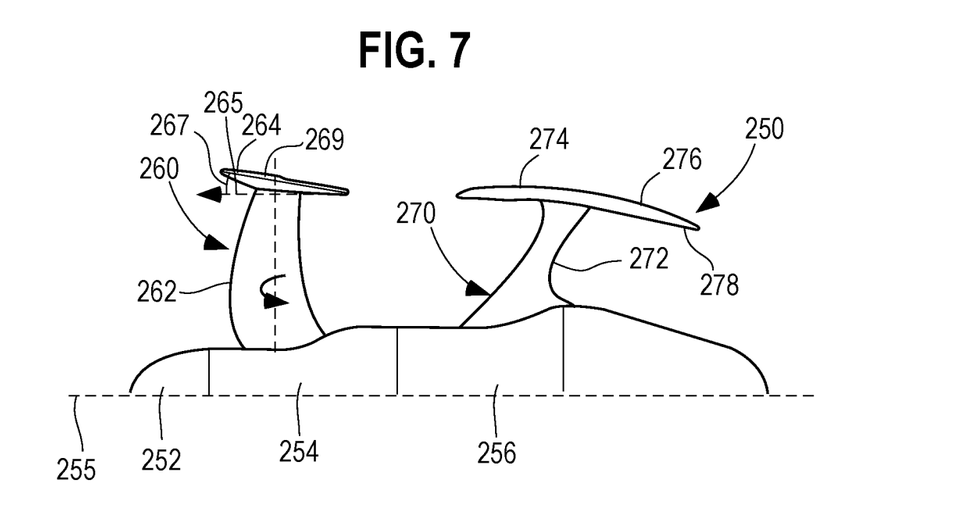
FIG. 7 depicts a sectional view of a third embodiment of the fan system having an outlet guide vane mounted rearward of the ring airfoil.

Referring to FIG. 6 and FIG. 7, the radius change of the hub across the root of the blades is shown. The nose 152 is mounted forward of the front hub 154 and the rear hub 156. As the front hub 154 and rear hub 156 extend rearward, the radii of each may increase. The hub radius 202 at the leading edge of the front blades 162 is less than the hub radius 204 at the trailing edge of the front blades 162. The hub radius 206 at the leading edge of the rear blades 172 of the rear rotor 170 is less than the hub radius 208 at the trailing edge of the rear blades 172 of the rear rotor 170. In the illustrated embodiment, the hub radius increases as the hub extends along the axis 155 from the nose 152.

The blades will be constructed of titanium or one or more composite materials. In various embodiments, the blades and ring airfoils will have composite bodies and titanium leading edges.

Referring to FIG. 7, third embodiment of the thrust ring and rotor fan system 250 comprises a front rotor 260 and an outlet guide vane 270 in place of a rear rotor. The outlet guide vane may be a single continuous guide vane ring 274 supported by a plurality of supports 272 mounted to the rear hub 256. The outlet guide vane 270 has an outboard surface 276 and an inboard surface 278. Additionally, the outlet guide vane may be replaced by a plurality of stator vanes.

The nose 252 is mounted forward of the front hub 254 and the rear hub 256. The front rotor 260 rotates about the axis 255 of rotation. The front hub 254 rotates about the axis 255. The front blades 262 are installed in a variable pitch orientation (rotatable) and are attached to a ring airfoil 264. The ring airfoil 264 has a cambered shape and an angle of attack 267 defined by the chord line 269 (which extends from the leading edge of the ring airfoil to the trailing edge of the ring airfoil) and the axial direction 265 (parallel to the axis 255 of rotation).

The embodiment(s) detailed above may be combined, in full or in part, with any alternative embodiment(s) described. In various embodiments, reference numerals are increased by one hundred to denote like structures.

INDUSTRIAL APPLICABILITY

Important advantages of a fan system comprising a plurality of blades joined by a ring airfoil include: high propulsive efficiency, reduction in the weight of the fan system, less drag, and noise reduction.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. Various embodiments of this disclosure are described herein, including the best mode known to the inventors for carrying out the disclosure. It should be understood that the illustrated embodiments are exemplary only, and should not be taken as limiting the scope of the disclosure.

We claim:

1. A fan system, comprising:
a rotor, the rotor being rotatable about an axis, the axis defining an axial direction;
the rotor having a plurality of blades attached to a forward hub, wherein the plurality of blades are variable pitch rotor blades; and
a ring airfoil, the ring airfoil attached to each of the plurality of blades, wherein the ring airfoil has a pressure surface and a suction surface, wherein the suction surface is positioned toward the plurality of blades and the pressure surface is positioned away from the plurality of blades;
wherein the ring airfoil has a cambered cross section, wherein the ring airfoil has an angle of attack defined by a chord line and the axial direction, and wherein the angle of attack is between 5 degrees and 30 degrees, wherein one or more outlet guide vanes are attached to a rear hub and positioned rearward of the ring airfoil in the axial direction, and the ring airfoil having an axial length extending in the axial direction, wherein the ring airfoil and the one or more outlet guide vanes are separated by a gap extending in the axial direction, the gap being greater than the axial length of the ring airfoil, wherein the forward hub has a larger radius at a trailing edge of the plurality of blades than at a leading edge of the plurality of blades, and wherein the rear hub has a larger radius at the one or more outlet guide vanes than the radius of the forward hub at the trailing edge of the plurality of blades.

2. The fan system of claim 1, wherein the ring airfoil has a first leading edge radius and the one or more outlet guide vanes support a single continuous guide vane ring having a second leading edge radius, wherein the first leading edge radius is greater than the second leading edge radius.

3. A fan system, comprising:
a first rotor that is rotatable about an axis defining an axial direction;
the first rotor having a first plurality of blades extending outwardly from a first hub;
a first ring airfoil, the first ring airfoil attached to each of the first plurality of blades;
a second rotor, the second rotor having a second plurality of blades attached to a second hub; and
a second ring airfoil, the second ring airfoil attached to each of the second plurality of blades;
wherein first rotor and the second rotor are contra-rotationally disposed on the axis, wherein the first ring airfoil has an axial length extending in the axial direction, and wherein the first ring airfoil and the second ring airfoil are separated by a gap extending in the axial direction, the gap being greater than the axial length of the first ring airfoil.

4. The fan system of claim 3, wherein the first plurality of blades are variable pitch rotor blades.

5. The fan system of claim 4, wherein the first ring airfoil and the second ring airfoil are cambered.

6. The fan system of claim 5, wherein the first ring airfoil has an angle of attack, the angle of attack defined by a chord line of the first ring airfoil and the axis, wherein the angle of attack is between 5 degrees and 30 degrees.

7. The fan system of claim 6, wherein the first ring airfoil has a pressure surface and a suction surface, wherein the suction surface is positioned toward the first plurality of blades and the pressure surface is positioned away from the first plurality of blades.

8. The fan system of claim 5, wherein the first ring airfoil having a first leading edge radius and the second ring airfoil having a second leading edge radius, wherein the first leading edge radius is greater than the second leading edge radius.

9. The fan system of claim 8, wherein the first rotor having a first trailing edge radius, wherein the first trailing edge radius is greater than the second leading edge radius.

10. The fan system of claim 9, wherein the second ring airfoil has an angle of attack between 5 degrees and 30 degrees.

11. The fan system of claim 10, wherein a first hub radius of the first hub at a leading edge of the first plurality of blades is less than a second hub radius of the second hub at a trailing edge of the first plurality of blades.

12. A method for operating a fan system, the method comprising:
- providing a first rotor comprising a first plurality of blades joined by a first ring airfoil, wherein the first ring airfoil has a camber;
- rotating the first rotor about a central axis defining an axial direction in a first direction, wherein the first ring airfoil generates thrust, and the first plurality of blades generates thrust;
- providing a second rotor comprising a second plurality of blades joined by a second ring airfoil, and wherein the first ring airfoil and the second ring airfoil are separated by a gap extending in the axial direction, the gap being greater than an axial length of the first ring airfoil extending in the axial direction; and
- rotating the second rotor in a direction opposite the first direction.

* * * * *